(12) United States Patent
Hashiba et al.

(10) Patent No.: US 6,791,228 B2
(45) Date of Patent: Sep. 14, 2004

(54) STATOR FOR A DYNAMOELECTRIC MACHINE

(75) Inventors: Mitsuharu Hashiba, Tokyo (JP); Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/442,050

(22) Filed: May 21, 2003

(65) Prior Publication Data

US 2003/0218394 A1 Nov. 27, 2003

(30) Foreign Application Priority Data

May 24, 2002 (JP) ........................................ 2002-150656

(51) Int. Cl.[7] .............................................. H02K 17/00
(52) U.S. Cl. ........................ 310/201; 310/71; 310/260; 310/180
(58) Field of Search ................................ 310/210–202, 310/206–208, 71, 179, 180, 260, 254, 214–215

(56) References Cited

U.S. PATENT DOCUMENTS

| | | | | |
|---|---|---|---|---|
| 3,453,468 A | * | 7/1969 | Lund | 310/180 |
| 3,748,510 A | * | 7/1973 | McNeal | 310/71 |
| 4,151,434 A | * | 4/1979 | Zona et al. | 310/71 |
| 4,309,634 A | * | 1/1982 | Koroly et al. | 310/201 |
| 4,335,325 A | * | 6/1982 | Miller et al. | 310/214 |
| 5,343,613 A | * | 9/1994 | Kintz et al. | 29/596 |
| 5,955,810 A | * | 9/1999 | Umeda et al. | 310/208 |
| 5,965,965 A | * | 10/1999 | Umeda et al. | 310/52 |
| 6,140,735 A | * | 10/2000 | Kato et al. | 310/201 |

FOREIGN PATENT DOCUMENTS

JP 64-074047 B 3/1989

* cited by examiner

*Primary Examiner*—Thanh Lam
(74) *Attorney, Agent, or Firm*—Sughrue Mion, PLLC

(57) ABSTRACT

A stator winding is constituted by first and second three-phase alternating-current windings. An output-wire lead wire of winding phase portions led out of Address 6 of a slot is bent so as to extend axially outward at a coil-end apex portion, and a neutral-point connection lead wire of the winding phase portions led out of Address 5 of the slots is bent so as to extend axially outward at a coil-end apex portion. The bent portions of the output-wire lead wires and the neutral-point connection lead wires extending axially outward are gathered together and a tube is mounted thereto.

8 Claims, 9 Drawing Sheets

STATOR FOR A DYNAMOELECTRIC MACHINE

BACKGROUND OF THE INVENTION

1. Field of the Invention

The present invention relates to a stator for a dynamoelectric machine such as an automotive alternator, for example, and particularly to a stator winding construction for suppressing protrusion of a lead wire of a stator winding from a coil end group.

2. Description of the Related Art

In recent years, compactness, high output, and improved quality have come to be in increasing demand in dynamoelectric machines such as automotive alternators, for example. Concerning compactness and high output in automotive alternators in particular, improvements in space factor of electrical conductors housed inside a magnetic circuit of a stator, and alignment in rows and increases in density of crossover portions of a stator winding (the crossover portions outside a stator core being called coil ends) are required.

A construction has been proposed in International Publication No. WO 92/06527 (Gazette), for example, attempting to improve the space factor of the electrical conductors and to achieve alignment in rows and increases in the density of the coil ends by using short conductor segments for the electrical conductors in the stator.

In this International Publication No. WO 92/06527 (Gazette), pairs of U-shaped conductor segments are inserted from a first end surface end of a stator core into pairs of slots in which the slots are separated by a predetermined number of slots. Then, open end portions of each of the conductor segments projecting outward at a second end surface end of the stator core are bent away from each other, and those open end portions are joined together with open end portions of other conductor segments projecting out of slots separated by a predetermined number of slots.

Thus, at the second end surface end of the stator core, pairs of joint portions joining together open end portions of the conductor segments projecting out of each of the pairs of slots are arranged at a predetermined pitch in a circumferential direction so as to line up in single columns in a radial direction, constituting a second coil end group neatly arranged in rows. At the first end surface end of the stator core, return portions of the pairs of conductor segments inserted into each of the pairs of slots are arranged at a predetermined pitch in a circumferential direction so as to line up in single columns in a radial direction, constituting a first coil end group neatly arranged in rows. In addition, four slot-housed portions of the conductor segments are housed in each of the slots so as to line up in a single column in a slot depth direction.

Thus, the space factor of the electrical conductors housed inside the slots is raised and alignment of the coil ends in rows and increased density in the stator winding is enabled, achieving a compact, high-output stator.

In this conventional stator, the stator winding has three winding phase portions, for example, each constructed by joining together large numbers of conductor segments, first end portions (neutral-point connection lead wires) of the three winding phase portions being joined together, in other words, formed into a Y connection, to constitute a three-phase alternating-current winding, and second end portions of the three winding phase portions forming output-wire lead wires for connection to a rectifier. In a dynamoelectric machine mounted with this stator, each of the output-wire lead wires is connected to the rectifier, alternating-current power generated in the stator being converted into and output as direct current.

In the conventional stator for a dynamoelectric machine, when the output-wire lead wires of the stator winding are constituted by conductors projecting out of radially-outermost positions inside the slots, the output-wire lead wires are more likely to protrude radially outward from the coil end groups of the stator winding. When the output-wire lead wires protrude radially outward from the outermost radial positions of the coil end groups, there are problems such as interference with the housing when the stator is being installed in the dynamoelectric machine, making mounting of the stator to the housing difficult, and the electrically-insulating coating of the conductor segments may also be damaged, making electrical insulation among the three winding phase portions poor. In addition, when installed in the housing, there are problems such as the clearance between the housing and the lead wires being restricted, making electrical insulation between the housing and the stator winding poor.

SUMMARY OF THE INVENTION

The present invention aims to solve the above problems and an object of the present invention is to provide a stator for a dynamoelectric machine enabling mounting to a housing and electrical insulation to be improved by suppressing protrusion of output-wire lead wires of winding phase portions radially outward from outermost radial positions of a coil end group.

With the above object in view, a stator for a dynamoelectric machine includes a cylindrical stator core in which a plurality of slots are disposed in a circumferential direction, and a stator winding having a plurality of winding sub-portions each formed by installing a conductor wire so as to be returned outside the slots at end surfaces of the stator core and to alternately occupy an inner layer and an outer layer in a slot depth direction within the slots at intervals of a predetermined number of slots, return portions of the conductor wires returned outside the slots being arranged regularly in a circumferential direction to constitute coil end groups. The stator winding includes at least one three-phase alternating-current winding constructed by Y-connecting three winding phase portions composed of the plurality of winding sub-portions. Neutral-point connection lead wires of the three winding phase portions are each led out of a layer other than an outermost layer inside the slots, and one of output-wire lead wires of each of the three winding phase portions is led out of the outermost layer inside the slots. The output-wire lead wires are positioned further inside than an outermost diameter of the coil end group relative to a radial direction.

Therefore, provided is a stator for a dynamoelectric machine improving mounting of the stator to a housing and also improving electrical insulation among the three winding phase portions by avoiding damage to an electrically-insulating coating on the conductor wires by suppressing interference with the housing when the stator is being installed in the dynamoelectric machine, and in addition, improving electrical insulation between the housing and the stator winding by ensuring clearance between the housing and the output-wire lead wire when installed in the housing.

DETAILED DESCRIPTION OF THE PREFERRED EMBODIMENTS

Preferred embodiments of the present invention will now be explained with reference to the drawings.

Embodiment 1

Figure 1:
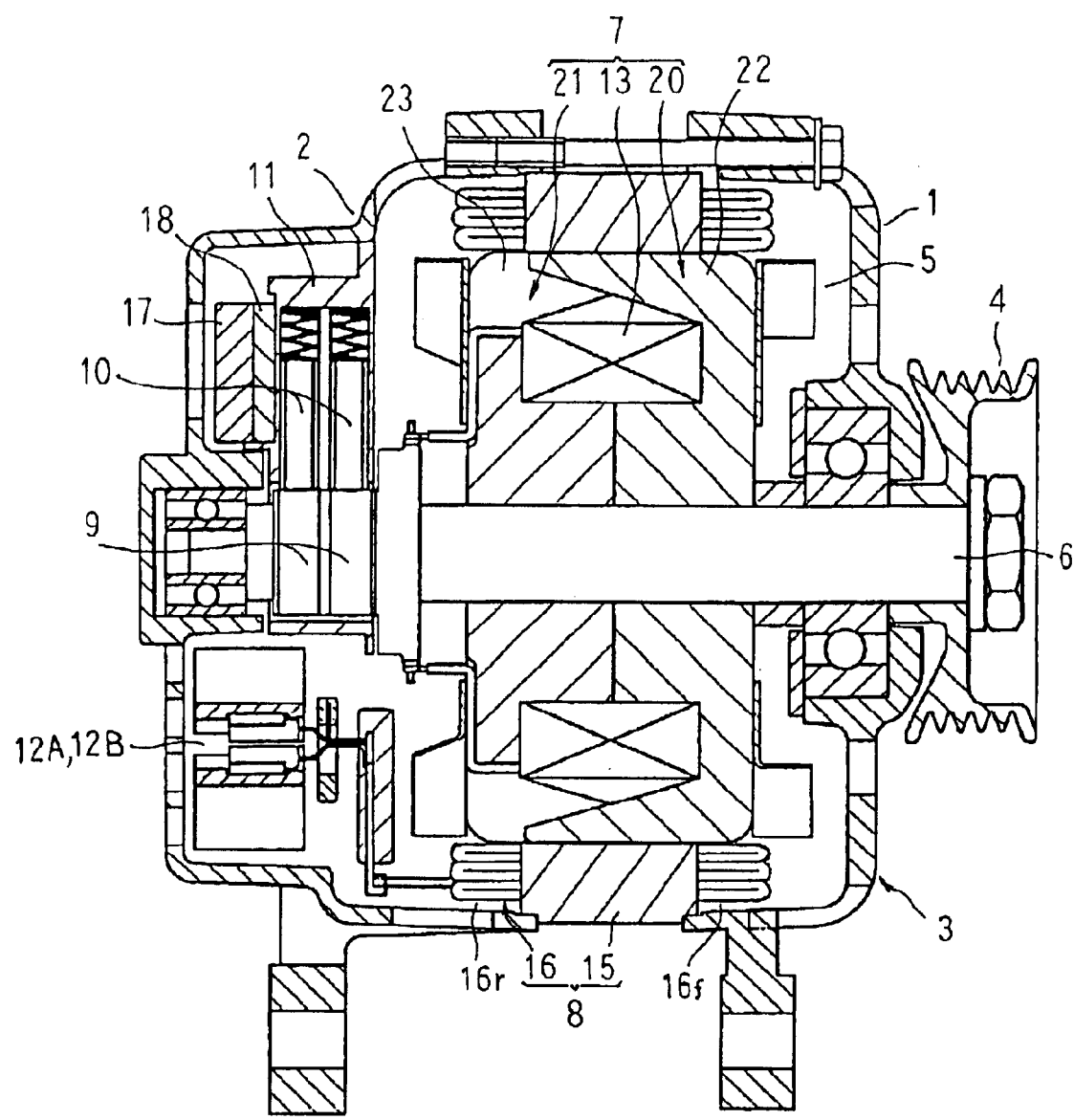
FIG. 1 is a longitudinal section showing an overall construction of an alternator according to Embodiment 1 of the present invention.
Figure 2:
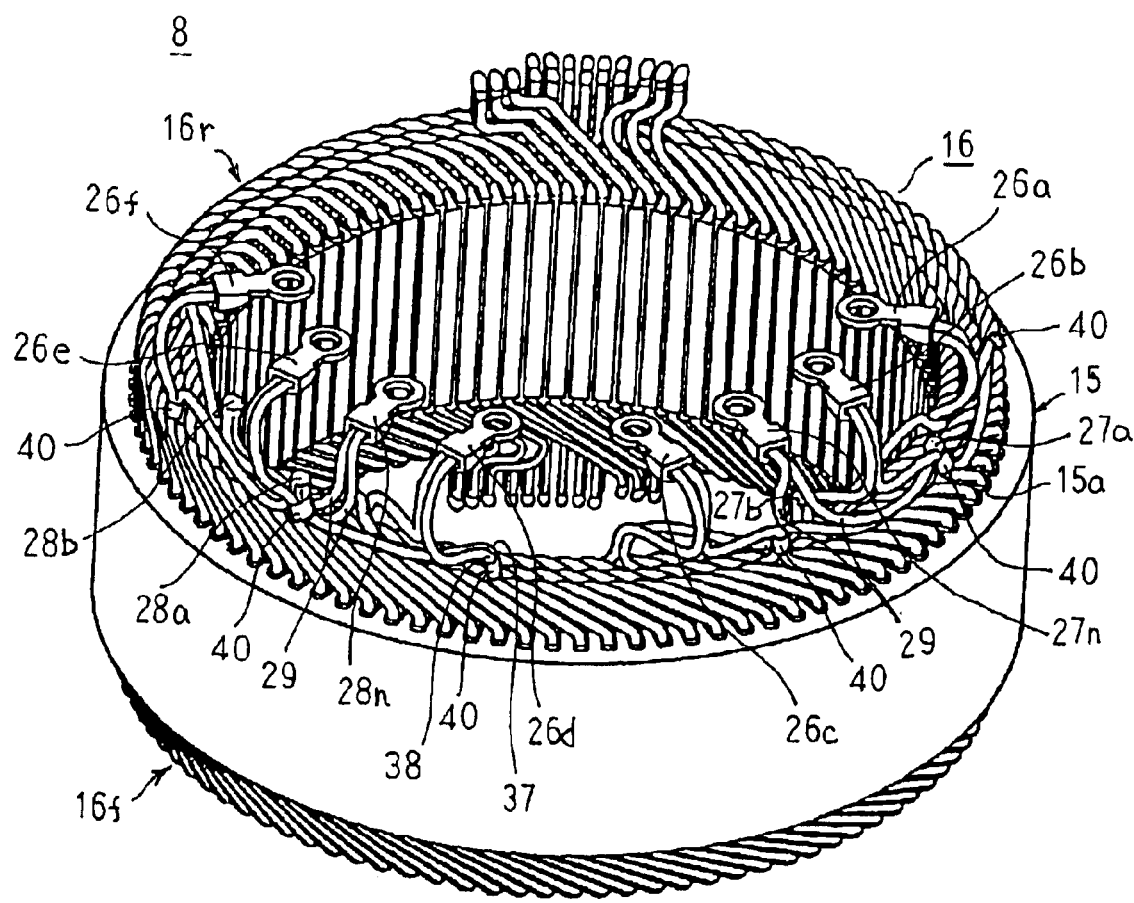
FIG. 2 is a perspective showing a stator according to Embodiment 1 of the present invention.
Figure 3:
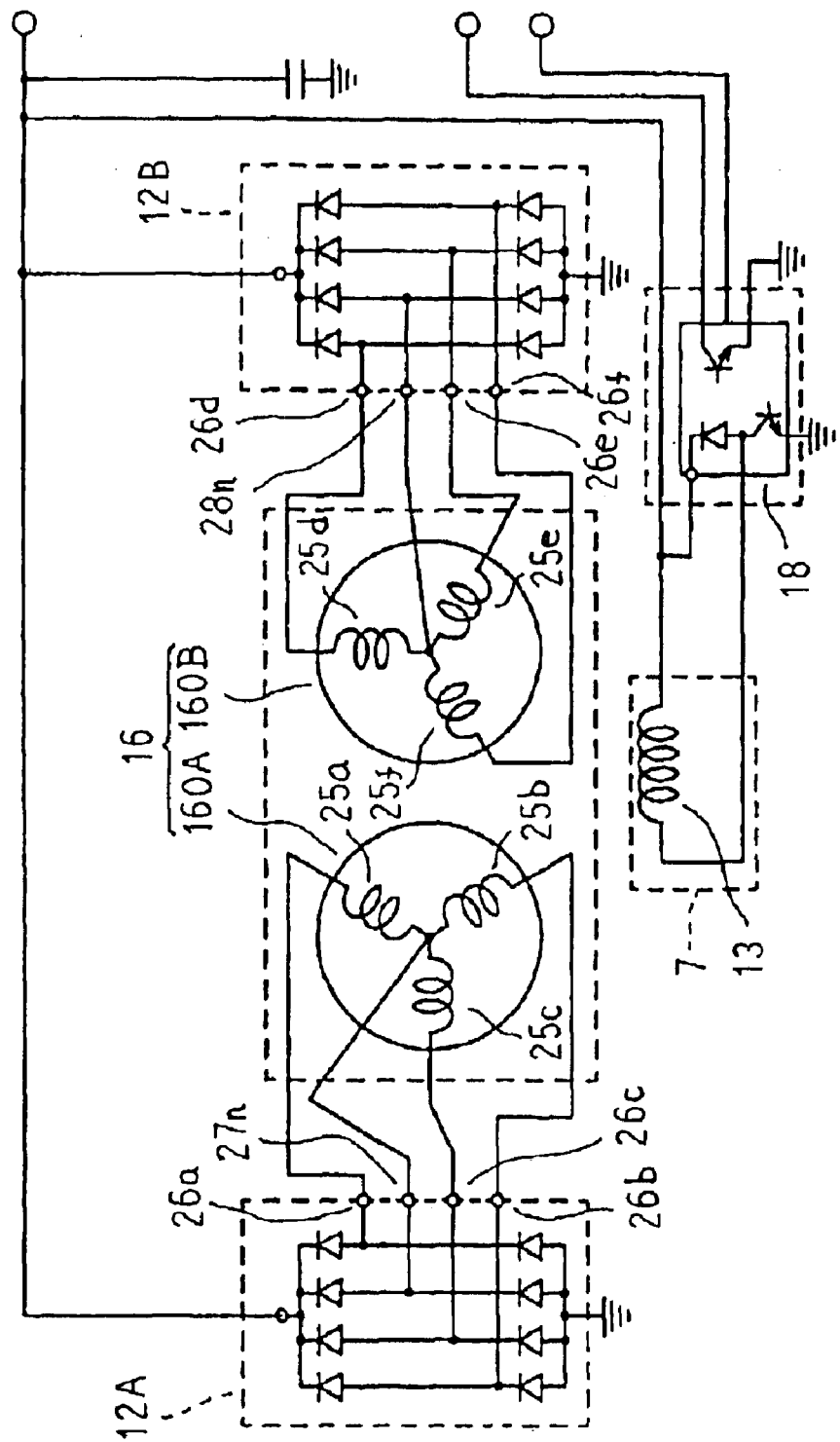
FIG. 3 is an electrical circuit diagram for the alternator according to Embodiment 1 of the present invention.
Figure 4:
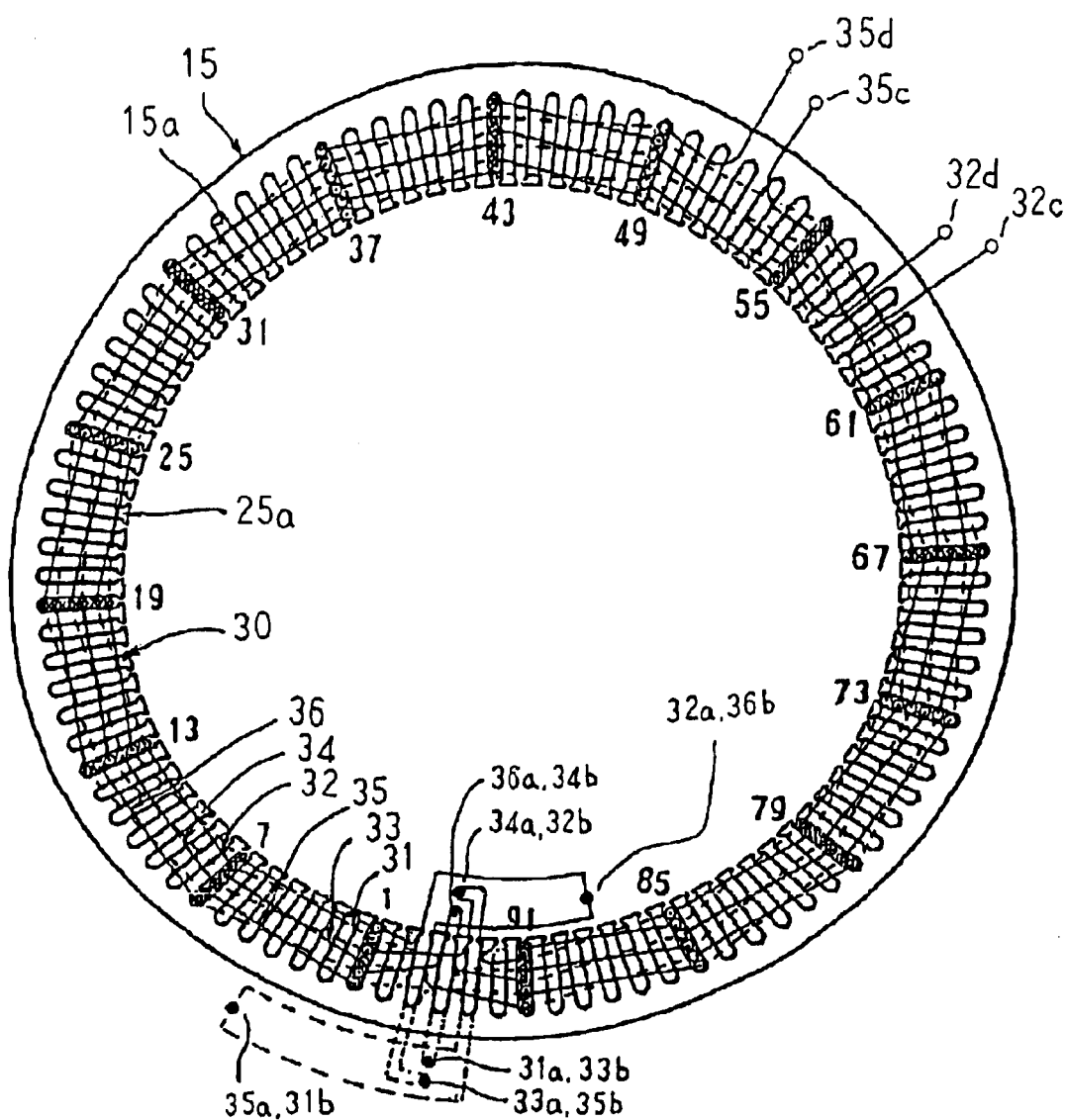
FIG. 4 is an end elevation explaining a construction of a stator winding of the stator according to Embodiment 1 of the present invention.
Figure 5:
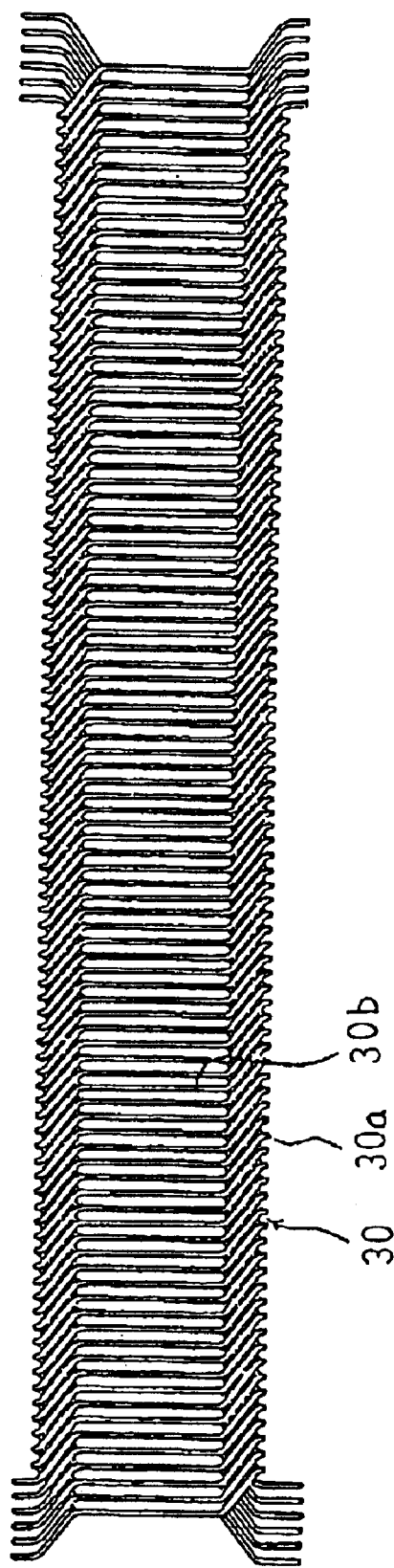
FIG. 5 is a plan showing a winding assembly constituting the stator winding of the stator according to Embodiment 1 of the present invention.
Figure 6:
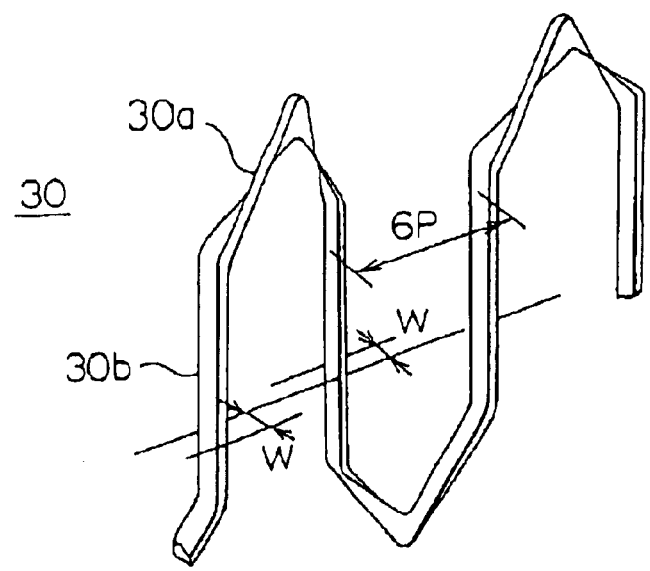
FIG. 6 is a perspective showing part of a continuous conductor wire constituting the winding assembly shown in FIG. 5.
Figure 7:
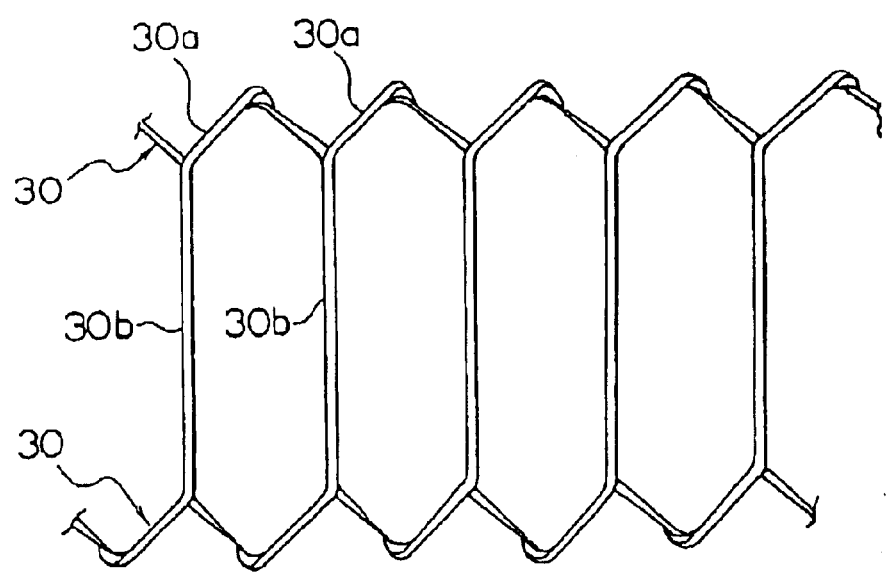
FIG. 7 is a perspective explaining an arrangement of continuous conductor wires constituting the winding assembly shown in FIG. 5.

FIG. 1 is a longitudinal section showing an overall construction of an alternator according to Embodiment 1 of the present invention, FIG. 2 is a perspective showing a stator according to Embodiment 1 of the present invention, FIG. 3 is an electrical circuit diagram for the alternator according to Embodiment 1 of the present invention, FIG. 4 is an end elevation explaining a construction of a stator winding of the stator according to Embodiment 1 of the present invention, FIG. 5 is a plan showing a winding assembly constituting the stator winding of the stator according to Embodiment 1 of the present invention, FIG. 6 is a perspective showing part of a continuous conductor wire constituting the winding assembly shown in FIG. 5, and FIG. 7 is a perspective explaining an arrangement of continuous conductor wires constituting the winding assembly shown in FIG. 5. Moreover, in FIG. 4, 1 through 96 represent slot numbers, broken lines indicate winding portions at a first end surface end, solid lines indicate winding portions at a second end surface end, and black dots indicate joint portions. Furthermore, to facilitate explanation, housing positions of conductor wires inside slots 15a will be designated Address 1, Address 2, etc., through Address 6, respectively, outward from a radially-inner side.

In FIGS. 1 to 3, an alternator functioning as a dynamo-electric machine is provided with: a housing 3 constituted by a front bracket 1 and a rear bracket 2 made of aluminum; a shaft 6 rotatably disposed inside the housing 3, a pulley 4 being fixed to a first end portion of the shaft 6; a Lundell-type rotor 7 fixed to the shaft 6; fans 5 fixed to first and second axial end portions of the rotor 7; a stator 8 fixed to the housing 3 so as to envelop the rotor 7; a pair of slip rings 9 fixed to a second end portion of the shaft 6 for supplying electric current to the rotor 7; a pair of brushes 10 each sliding on a surface of the slip rings 9; a brush holder 11 for accommodating the brushes 10; first and second rectifiers 12A and 12B electrically connected to the stator 8 for converting alternating current generated in the stator 8 into direct current; and a regulator 18 mounted to a heat sink 17 fitted onto the brush holder 11, the regulator 18 adjusting the magnitude of an alternating voltage generated in the stator 8.

The first and second rectifiers 12A and 12B are each constructed by connecting in parallel four diode pairs connected in series.

The rotor 7 is provided with: a field winding 13 for generating a magnetic flux on passage of an electric current; and a pair of first and second pole cores 20 and 21 disposed so as to cover the field winding 13, magnetic poles being formed in the first and second pole cores 20 and 21 by the magnetic flux from the field winding 13. The first and second pole cores 20 and 21 are made of iron, each has eight first and second claw-shaped magnetic poles 22 and 23 each having a generally trapezoidal outermost diameter surface shape disposed so as to project axially on an outer circumferential edge portion at a uniform angular pitch in a circumferential direction, and the first and second pole cores 20 and 21 are fixed to the shaft 6 facing each other such that the first and second claw-shaped magnetic poles 22 and 23 intermesh. In other words, the number of magnetic poles in this rotor 7 is sixteen.

The stator 8 is constituted by: a cylindrical stator core 15 in which slots 15a are formed at a predetermined pitch in a circumferential direction so as to open onto an inner circumferential side; and a stator winding 16 installed in the slots 15a of the stator core 15. Here, the slots 15a are formed in the stator core 15 at a ratio of two per phase per pole, in other words, there are ninety-six slots 15a.

The stator winding 16 is constituted by: a first three-phase alternating current winding 160A in which an a-phase winding phase portion 25a, a b-phase winding phase portion 25b, and a c-phase winding phase portion 25c are formed into a Y connection; and a second three-phase alternating-current winding 160B in which a d-phase winding phase portion 25d, an e-phase winding phase portion 25e, and an f-phase winding phase portion 25f are formed into a Y connection.

The stator 8 is mounted to the housing 3 so as to be held between the front bracket 1 and the rear bracket 2 so as to form a uniform air gap between outer circumferential surfaces of the claw-shaped magnetic poles 22 and 23 and an inner circumferential surface of the stator core 15. In addition, the electrical circuit shown in FIG. 3 is constructed by connecting to the first rectifier 12A first, second, and third output connection terminals 26a, 26b, and 26c which constitute output terminals of the first three-phase alternating-current winding 160A and a first neutral-point connection terminal 27n which constitutes a neutral-point terminal thereof, and connecting to the second rectifier 12B fourth, fifth, and sixth output connection terminals 26d, 26e, and 26f which constitute output terminals of the second three-phase alternating-current winding 160B and a second neutral-point connection terminal 28n which constitutes a neutral-point terminal thereof.

In the alternator constructed in this manner, torque from an engine is transferred to the pulley 4 by means of a belt (not shown), driving the shaft 6 to rotate. The rotor 7 rotates due to the rotation of the shaft 6. In this state, an excitation current is supplied from a battery (not shown) through the brushes 10 and the slip rings 9 to the field winding 13, magnetizing the first and second claw-shaped magnetic poles 22 and 23 of the pole core 20 and 21. Thus, a rotating magnetic field is applied to the stator winding 16, generating a three-phase alternating current voltage in the first and second three-phase alternating-current windings 160A and 160B. This three-phase alternating-current voltage is rectified by the first and second rectifiers 12A and 12B and is output through output terminals of the first and second rectifiers 12A and 12B.

Next, the construction of the a-phase winding phase portion 25a constituting the stator winding 16 will now be explained in detail with reference to FIG. 4.

The a-phase winding phase portion 25a is constituted by first to sixth winding sub-portions 31 to 36 in each of which one continuous conductor wire 30 composed of a copper wire having a rectangular cross section coated with an electrical insulator is installed in every sixth slot of the slots 15a.

The first winding sub-portion 31 is prepared by wave winding a continuous conductor wire 30 so as to be returned outside the slots 15a at the first and second end surfaces of the stator core 15 and alternately occupy Address 2 and Address 1 in every sixth slot of the slots 15a from Slot Number 1 to Slot Number 91. The second winding sub-portion 32 is prepared by wave winding a continuous conductor wire 30 so as to be returned outside the slots 15a at the first and second end surfaces of the stator core 15 and alternately occupy Address 1 and Address 2 in every sixth slot of the slots 15a from Slot Number 1 to Slot Number 91.

The third winding sub-portion 33 is prepared by wave winding a continuous conductor wire 30 so as to be returned outside the slots 15a at the first and second end surfaces of the stator core 15 and alternately occupy Address 4 and Address 3 in every sixth slot of the slots 15a from Slot Number 1 to Slot Number 91. The fourth winding sub-portion 34 is prepared by wave winding a continuous conductor wire 30 so as to be returned outside the slots 15a at the first and second end surfaces of the stator core 15 and alternately occupy Address 3 and Address 4 in every sixth slot of the slots 15a from Slot Number 1 to Slot Number 91.

The fifth winding sub-portion 35 is prepared by wave winding a continuous conductor wire 30 so as to be returned outside the slots 15a at the first and second end surfaces of the stator core 15 and alternately occupy Address 6 and Address 5 in every sixth slot of the slots 15a from Slot Number 1 to Slot Number 91. The sixth winding sub-portion 36 is prepared by wave winding a continuous conductor wire 30 so as to be returned outside the slots 15a at the first and second end surfaces of the stator core 15 and alternately occupy Address 5 and Address 6 in every sixth slot of the slots 15a from Slot Number 1 to Slot Number 91.

At the first end surface end of the stator core 15, a winding start end portion 31a of the first winding sub-portion 31 projecting from Address 2 of Slot Number 1 and a winding finish end portion 33b of the third winding sub-portion 33 projecting from Address 3 of Slot Number 91 are stacked radially and joined together by tungsten-inert gas (TIG) welding, for example, a winding start end portion 33a of the third winding sub-portion 33 projecting from Address 4 of Slot Number 1 and a winding finish end portion 35b of the fifth winding sub-portion 35 projecting from Address 5 of Slot Number 91 are stacked radially and joined together by TIG welding, and in addition a winding start end portion 35a of the fifth winding sub-portion 35 projecting from Address 6 of Slot Number 1 and a winding finish end portion 31b of the first winding sub-portion 31 projecting from Address 1 of Slot Number 91 are stacked radially and joined together by TIG welding. Thus, a three-turn wave winding is obtained in which the first, third, and fifth winding sub-portions 31, 33, and 35 are connected in series.

At the second end surface end of the stator core 15, a winding start end portion 32a of the second winding sub-portion 32 projecting from Address 1 of Slot Number 1 and a winding finish end portion 36b of the sixth winding sub-portion 36 projecting from Address 6 of Slot Number 91 are stacked radially and joined together by TIG welding, a winding start end portion 34a of the fourth winding sub-portion 34 projecting from Address 3 of Slot Number 1 and a winding finish end portion 32b of the second winding sub-portion 32 projecting from Address 2 of Slot Number 91 are stacked radially and joined together by TIG welding, and a winding start end portion 36a of the sixth winding sub-portion 36 projecting from Address 5 of Slot Number 1 and a winding finish end portion 34b of the fourth winding sub-portion 34 projecting from Address 4 of Slot Number 91 are stacked radially and joined together by TIG welding. Thus, a three-turn wave winding is obtained in which the second, fourth, and sixth winding sub-portions 32, 34, and 36 are connected in series.

A portion of the fifth winding sub-portion 35 projecting at the second end surface end of the stator core 15 from Slot Numbers 49 and 55 is cut, and a portion of the second winding sub-portion 32 projecting at the second end surface end of the stator core 15 from Slot Numbers 55 and 61 is cut. A second cut end 35d of the fifth winding sub-portion 35 projecting out of Address 6 of Slot Number 49 and a first cut end 32c of the second winding sub-portion 32 projecting out of Address 1 of slot number Slot Number 61 form output-wire lead wires, and a first cut end 35c of the fifth winding sub-portion 35 projecting out of Address 5 of Slot Number 55 and a second cut end 32d of the second winding sub-portion 32 projecting out of Address 2 of Slot Number 55 form neutral-point connection lead wires. Thus, the three-turn wave winding in which the first, third, and fifth winding sub-portions 31, 33, and 35 are connected in series and the three-turn wave winding in which the second, fourth, and sixth winding sub-portions 32, 34, and 36 are connected in series are connected in parallel, constituting the three-turn a-phase winding phase portion 25a.

Although not shown, the d-phase winding phase portion 25d is constructed by similarly installing six continuous conductor wires 30 in a slot group including Slot Numbers 2, 8, etc., through 92. The b-phase winding phase portion 25b is constructed by similarly installing six continuous conductor wires 30 in a slot group including Slot Numbers 3, 9, etc., through 93. The e-phase winding phase portion 25e is constructed by similarly installing six continuous conductor wires 30 in a slot group including Slot Numbers 4, 10, etc., through 94. The c-phase winding phase portion 25c is constructed by similarly installing six continuous conductor wires 30 in a slot group including Slot Numbers 5, 11, etc., through 95. The f-phase winding phase portion 25f is constructed by similarly installing six continuous conductor wires 30 in a slot group including Slot Numbers 6, 12, etc., through 96.

Next, the second cut end 35d of the fifth winding sub-portion 35 and the first cut end 32c of the second winding sub-portion 32 constituting the a-phase winding phase portion 25a are led around a second coil end group 16r, gathered together, and connected to the first output connection terminal 26a, the second cut end 35d of the fifth winding sub-portion 35 and the first cut end 32c of the second winding sub-portion 32 constituting the b-phase winding phase portion 25b are led around the second coil end group 16r, gathered together, and connected to the second output connection terminal 26b, and the second cut end 35d of the fifth winding sub-portion 35 and the first cut end 32c of the second winding sub-portion 32 constituting the c-phase winding phase portion 25c are led around the second coil end group 16r, gathered together, and connected to the third output connection terminal 26c. The first cut end 35c of the fifth winding sub-portions 35 constituting the a-phase winding phase portion 25a, the b-phase winding phase portion 25b, and the c-phase winding phase portion 25c are led around the second coil end group 16r, gathered together, and TIG welded to constitute a first joint portion 27a, and the second cut end 32d of the second winding sub-portions 32 constituting the a-phase winding phase portion 25a, the b-phase winding phase portion 25b, and the c-phase winding phase portion 25c are led around the second coil end group 16r, gathered together, and TIG welded to constitute a second joint portion 27b. In addition, two conductor wires 29 connected to the first neutral-point connection terminal 27n are TIG welded to each of the joint portions 27a and 27b. Hence, the first three-phase alternating-current winding 160A is constructed in which the a-phase winding phase portion 25a, the b-phase winding phase portion 25b, and the c-phase winding phase portion 25c are formed into a Y connection.

The second cut end 35d of the fifth winding sub-portion 35 and the first cut end 32c of the second winding sub-portion 32 constituting the d-phase winding phase portion 25d are led around a second coil end group 16r, gathered together, and connected to the fourth output connection terminal 26d, the second cut end 35d of the fifth winding sub-portion 35 and the first cut end 32c of the second winding sub-portion 32 constituting the e-phase winding phase portion 25e are led around the second coil end group 16r, gathered together, and connected to the fifth output connection terminal 26e, and the second cut end 35d of the fifth winding sub-portion 35 and the first cut end 32c of the second winding sub-portion 32 constituting the f-phase winding phase portion 25f are led around the second coil end group 16r, gathered together, and connected to the sixth output connection terminal 26f. The first cut end 35c of the fifth winding sub-portions 35 constituting the d-phase winding phase portion 25d, the e-phase winding phase portion 25e, and the f-phase winding phase portion 25f are led around the second coil end group 16r, gathered together, and TIG welded to constitute a first joint portion 28a, and the second cut end 32d of the second winding sub-portions 32 constituting the d-phase winding phase portion 25d, the e-phase winding phase portion 25e, and the f-phase winding phase portion 25f are led around the second coil end group 16r, gathered together, and TIG welded to constitute a second joint portion 28b. In addition, two conductor wires 29 connected to the second neutral-point connection terminal 28n are TIG welded to each of the joint portions 28a and 28b. Hence, the second three-phase alternating-current winding 160B is constructed in which the d-phase winding phase portion 25d, the e-phase winding phase portion 25e, and the f-phase winding phase portion 25f are formed into a Y connection.

Before this connection process, the second cut end 35d of the fifth winding sub-portion 35 of the a-phase winding phase portion 25a, which projects from Address 6 of a slot 15a, is bent radially inward, is led around to a coil-end apex portion, and is bent axially outward. The first cut end 35c of the fifth winding sub-portion 35 of the a-phase winding phase portion 25a, which projects from Address 5 of a slot 15a, is bent radially outward, is led around to a coil-end apex portion, and is bent axially outward. A tube 40 made of a nylon is mounted to both the first and second cut ends 35c and 35d together, the bent portions 37 and 38 of the first and second cut ends 35c and 35d bending to the axial outside being fastened by the tube 40.

Moreover, tubes 40 are also mounted similarly to the first and second cut ends 35c and 35d of the b-phase winding phase portion 25b, the c-phase winding phase portion 25c, the d-phase winding phase portion 25d, the e-phase winding phase portion 25e, and the f-phase winding phase portion 25f.

This stator winding 16 is achieved by mounting winding assemblies 41, such as that shown in FIG. 5, to the stator core 15 so as to be superposed in three layers.

These winding assemblies 41 are prepared by simultaneously folding twelve continuous conductor wires 30 arranged parallel to each other at a pitch of one slot on a common plane.

As shown in FIG. 6, each of the continuous conductor wires 30 is shaped by bending into a planar pattern in which straight portions 30b joined by return portions 30a are arranged at a pitch of six slots (6P). Adjacent pairs of the straight portions 30b are offset by the return portions 30a by a width (W) of the continuous conductor wires 30.

Six pairs of continuous conductor wires in each of which two of the continuous conductor wires 30 formed into such a pattern are offset by a pitch of six slots with straight portions 30b superposed as shown in FIG. 7 are arranged so as to be offset by a pitch of one slot from each other to constitute each winding assembly 41. Six end portions of the continuous conductor wires 30 extend outward on first and second sides at first and second ends of the winding assemblies 41. Ninety-six pairs of superposed straight portions 30b (equal to the number of slots) are arranged at a pitch of one slot. In addition, the return portions 30b are arranged in neat rows along the first and second sides of the winding assemblies 41.

The winding assemblies 41 constructed in this manner are mounted in three layers such that the pairs of straight portions 30b are housed in the slots of a rectangular parallelepiped core (not shown). The rectangular parallelepiped core is rolled up into a cylindrical shape, end portions of the rectangular parallelepiped core are abutted and welded, and connections are made based on the connection method shown in FIG. 4 to obtain the stator 8 mounted with the stator winding 16 shown in FIG. 2.

In the stator 8 constructed in this manner, six straight portions 30b of the continuous conductor wires 30 are housed inside each of the slots 15a in single columns such that longitudinal axes of their rectangular cross sections align radially. Each of the continuous conductor wires 30 is installed so as to be returned outside the slots 15a at the first and second end surfaces of the stator core 15 and alternately occupy an inner layer and an outer layer in a slot depth direction in every sixth slot of the slots 15a. At first and second axial end portions of the stator core 15, the return portions 30a of the continuous conductor wires 30 constitute coil ends (return portions) and are arranged in neat rows in a circumferential direction such that groups of three return portions 30a line up in single columns in a radial direction, constituting first and second coil end groups 16f and 16r, respectively.

Moreover, although not shown, portions constituting the output-wire and neutral-point connection lead wires of the stator winding 16 are formed so as to project out from the return portions 30a by paying out extra amounts of the continuous conductor wires 30 in question during the process of simultaneously folding the twelve continuous conductor wires 30. Then, the portions projecting from those return portions 30a are cut and serve as the output-wire and neutral-point connection lead wires. The tubes 40 are mounted after this cutting.

Thus, according to Embodiment 1, because the straight portions 30b of the continuous conductor wires 30 constituting the stator winding 16 are housed so as to line up in single columns inside each of the slots 15a, the space factor of the conductor wires is raised. Because groups of three return portions 30a are arranged regularly in neat rows in a circumferential direction so as to line up in single columns in a radial direction at the first and second ends of the stator core 15, alignment in rows and increased density are enabled in the coil ends of the stator winding 16. As a result, compactness and high output are achieved in the stator.

The second cut ends 35d (the output-wire lead wires) of the fifth winding sub-portions 35 projecting out of Address 6 (the radially-outermost positions) of the slots 15a are each fastened by tubes 40 in the vicinity of apex portions of the coil ends to a first cut end 35c (the neutral-point connection lead wires) of the fifth winding sub-portions 35 projecting out of Address 5. After being fastened to the second cut ends 35d by the tubes 40, the first cut ends 35c are led around on top of the coil end group in a circumferential direction and other first cut ends 35c are joined thereto at the joint portions 27a, 27b, 28a, and 28b, raising the rigidity of the first cut ends 35c. Thus, radially-outward displacement of the second cut ends 35d is prevented by the rigidity of the first cut ends 35c fastened thereto by means of the tubes 40, eliminating protrusion of the second cut ends 35d radially outward from the second coil end group 16r. Protrusion of the first cut ends 35c radially outward from the second coil end group 16r is also eliminated. In addition, the first cut ends 32c of the second winding sub-portions 32 constituting the output-wire lead wires project from Address 1 of the slots 15a, and the second cut ends 32d of the second winding sub-portions 32 constituting the neutral-point connection lead wires project from Address 2 of the slots 15a, eliminating protrusion radially outward from the second coil end group 16r.

As a result, when the stator 8 is being installed in the dynamoelectric machine, the second cut ends 35d constituting the output-wire lead wires do not interfere with the housing 3, thereby improving mounting to the housing 3. Thus, electrically-insulating coating damage to the continuous conductor wires 30 resulting from interference with the housing 3 is eliminated, improving electrical insulation among the three winding phase portions. In addition, once the stator 8 has been installed in the housing 3, a predetermined clearance is ensured between the housing 3 and the second cut ends 35d, improving electrical insulation between the housing 3 and the stator winding 16.

When the cut ends 35c and 35d are led around in order to join the first cut ends 35c together or to connect the second cut ends 35d to the output connection terminals, portions of the cut ends 35c and 35d in the vicinity of the coil-end apex portions come into contact with the adjacent return portions 30a easily. However, because the tubes 40 are mounted to the portions of the cut ends 35c and 35d projecting from the second coil end group, the occurrence of damage to the electrically-insulating coating resulting from contact with the adjacent return portions 30a is suppressed, improving electrical insulation.

Because the tubes 40 are mounted to the portions of the cut ends 35c and 35d projecting from the second coil end group, electrical insulation distance from the adjacent return portions 30a is ensured, improving electrical insulation.

Moreover, in Embodiment 1 above, the first cut ends 35c constituting the neutral-point connection lead wires project from Address 5 of the slots 15a, but the neutral-point connection lead wires are not limited to this address and provided that they do not project from the outermost layer of the slots 15a. In other words, the position from which the neutral-point connection lead wires are led out of the slots is set according to the methods for installing and for connecting the first to sixth winding sub-portions 31 to 36. For example, if the first and second winding phase portions 31 and 32 are installed so as to alternately occupy Address 1 and Address 2, the third and fourth winding sub-portions 33 and 34 are installed so as to alternately occupy Address 3 and Address 5, the fifth and sixth winding sub-portions 35 and 36 is installed so as to alternately occupy Address 4 and Address 6, and all are connected similarly, the cut ends 35d and 32c constituting the output-wire lead wires project from Address 6 and Address 1, respectively, of the slots 15a, and the cut ends 35c and 32d constituting the neutral-point connection lead wires project from Address 4 and Address 2, respectively, of the slots 15a.

In Embodiment 1 above, each of the winding phase portions is constructed by connecting in parallel a three-turn wave winding in which the first, third, and fifth winding sub-portions 31, 33, and 35 are connected in series and a three-turn wave winding in which the second, fourth, and sixth winding sub-portions 32, 34, and 36 are connected in series, but each of the winding phase portions may also be constituted by a six-turn wave winding in which the first to sixth winding sub-portions 31 to 36 are connected in series. In that case, the first and second three-phase alternating-current windings have three sets of output-wire lead wires and neutral-point connection lead wires each. The three output-wire lead wires of each of the first and second three-phase alternating-current windings are led out of Address 6 of the slots 15a.

Embodiment 2

Figure 8:
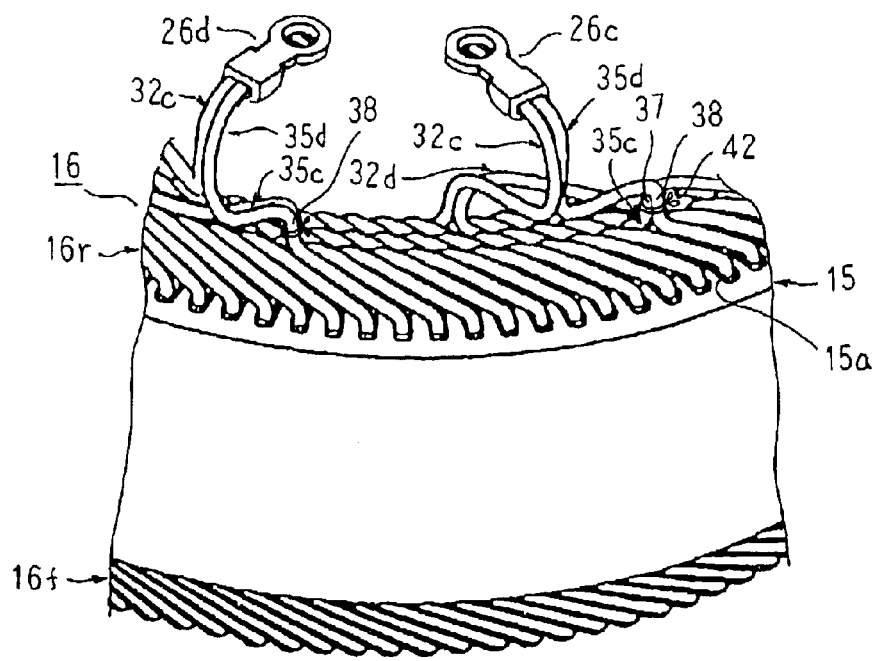
FIG. 8 is a perspective showing part of a stator according to Embodiment 2 of the present invention.

In Embodiment 1 above, the second cut ends 35d constituting the output-wire lead wires and the first cut ends 35c constituting the neutral-point connection lead wires are fastened by tubes 40, but in Embodiment 2, as shown in FIG. 8, the bent portions 38 of the second cut ends 35d constituting the output-wire lead wires and the bent portions 37 of the first cut ends 35c constituting the neutral-point connection lead wires are fastened using ties 42.

Moreover, the rest of this embodiment is constructed in a similar manner to Embodiment 1 above.

In Embodiment 2, radially-outward displacement of the second cut ends 35d is prevented by the rigidity of the first cut ends 35c fastened thereto by the ties 42, eliminating protrusion of the second cut ends 35d radially outward from the second coil end group 16r. The portions of the cut ends 35c and 35d fastened by the ties 42 are also less likely to be displaced in a circumferential direction. Consequently, similar effects to those in Embodiment 1 above can also be achieved in Embodiment 2.

Embodiment 3

Figure 9:
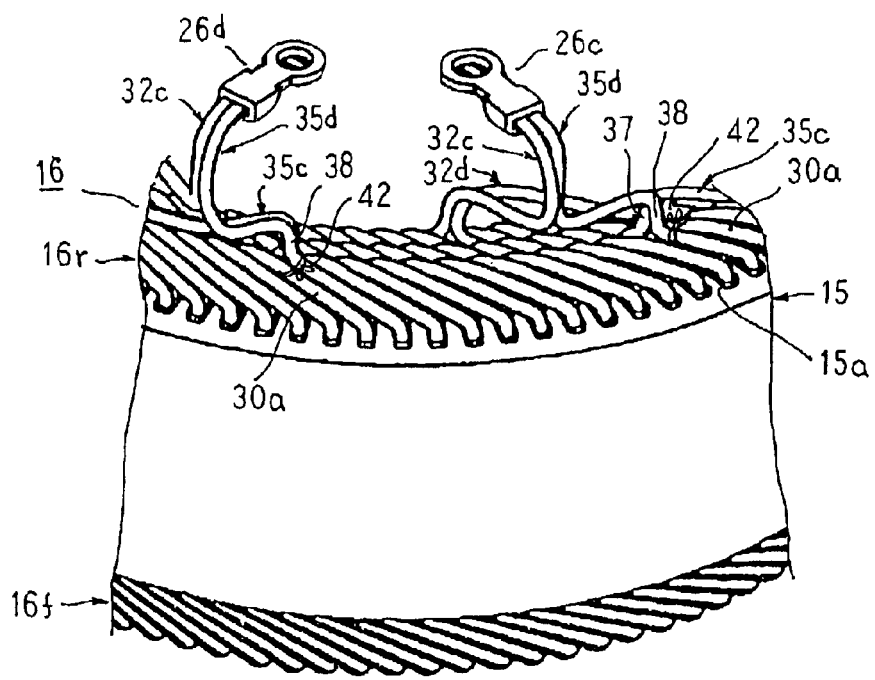
FIG. 9 is a perspective showing part of a stator according to Embodiment 3 of the present invention.

In Embodiment 2 above, the second cut ends 35d constituting the output-wire lead wires and the first cut ends 35c constituting the neutral-point connection lead wires are fastened by ties 42, but in Embodiment 3, as shown in FIG. 9, root portions of the bent portions 38 of the second cut ends 35d constituting the output-wire lead wires and adjacent return portions 30a are fastened by ties 42.

Moreover, the rest of this embodiment is constructed in a similar manner to Embodiment 2 above.

In Embodiment 3, radially-outward displacement of the second cut ends 35d is prevented by the rigidity of the adjacent return portions 30a fastened thereto by the ties 42, eliminating protrusion of the second cut ends 35d radially outward from the second coil end group 16r. The portions of the second cut ends 35d fastened by the ties 42 are also less likely to be displaced in a circumferential direction. Consequently, similar effects to those in Embodiment 2 above can also be achieved in Embodiment 3.

Embodiment 4

Figure 10:
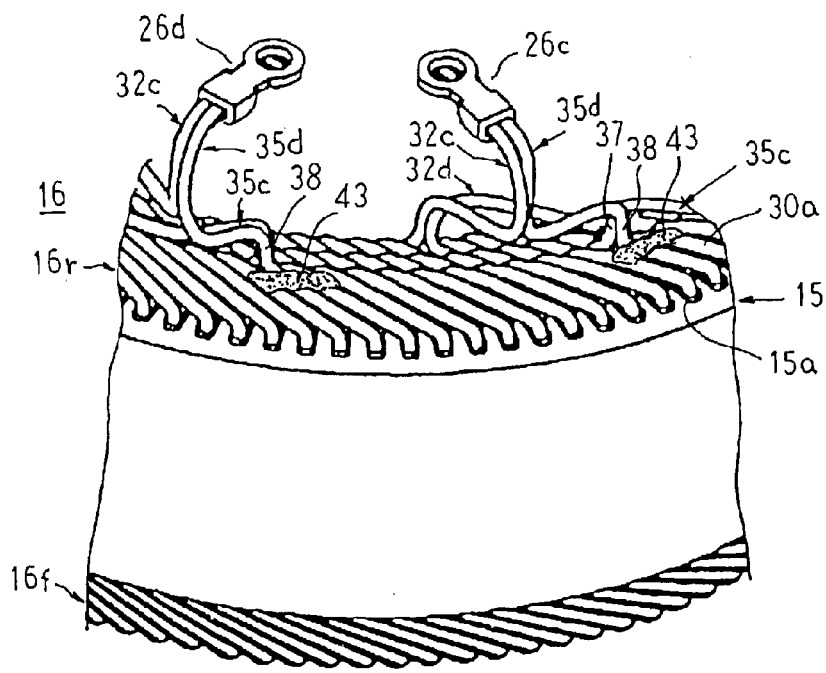
FIG. 10 is a perspective showing part of a stator according to Embodiment 4 of the present invention.

In Embodiment 3 above, the second cut ends 35d constituting the output-wire lead wires and the adjacent return portions 30a are fastened by ties 42, but in Embodiment 4, as shown in FIG. 10, similar effects are achieved by fixing root portions of the bent portions 38 of the second cut ends 35d constituting the output-wire lead wires and adjacent return portions 30a with an adhesive 43 (an electrically-insulating resin) such as an epoxy resin, etc.

Embodiment 5

Figure 11:
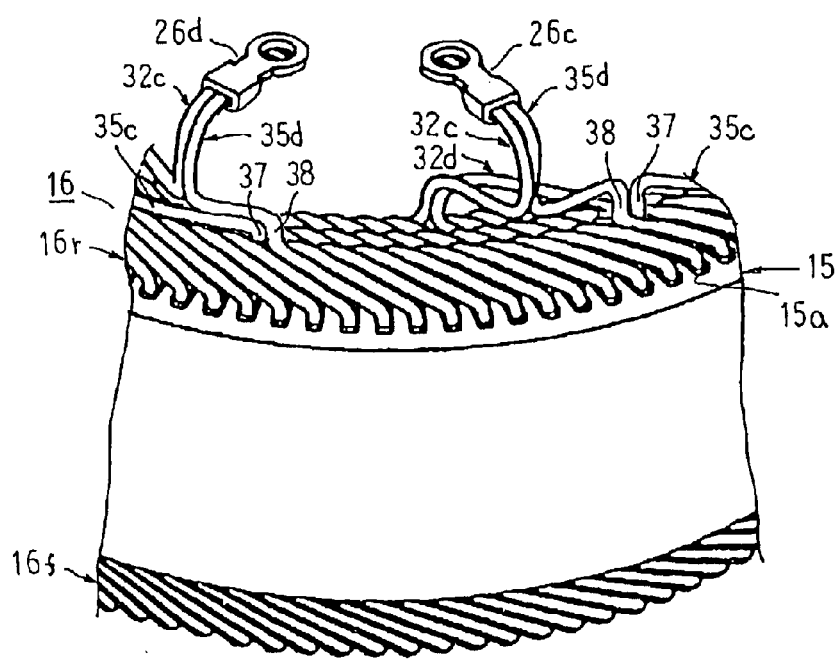
FIG. 11 is a perspective showing part of a stator according to Embodiment 5 of the present invention.

In Embodiment 5, as shown in FIG. 11, the second cut ends 35d constituting the output-wire lead wires are led out from Address 6 of the slots 15a, are bent radially inward and led around to the apex portions of the coil ends, and are then shaped by bending so as to extend in an axial direction. Similarly, the first cut ends 35c constituting the neutral-point connection lead wires are led out from Address 5 of the slots 15a, are bent radially outward and led around to the apex portions of the coil ends, and are then shaped by bending so as to extend in an axial direction. Here, the bent portions 37 and 38 of the cut ends 35c and 35d which are formed so as to extend in the axial direction are adjacent in a circumferential direction. The second cut ends 35d projecting in the axial direction serve in connecting to the first to sixth output connection terminals 26a, 26b, 26c, 26d, 26e, and 26f, and the first cut ends 35c projecting in the axial direction are led around on top of the second coil end group, and serve in joining at the joint portions 27a, 27b, 28a, and 28b.

Moreover, the rest of this embodiment is constructed in a similar manner to Embodiment 1 above.

In Embodiment 5, the second cut ends 35d constituting the output-wire lead wires, which project from Address 6 of the slots 15a, are led around to the apex portions of the coil ends, and then shaped by bending axially outward. Similarly, the first cut ends 35c constituting the neutral-point connection lead wires, which project from Address 5 of the slots 15a, are led around to the apex portions of the coil ends, and then shaped by bending axially outward. The bent portions 37 of the first cut ends 35c and the bent portions 38 of the second cut ends 35d line up adjacently in a circumferential direction. In other words, the bent portions 37 of the first cut ends 35c and the bent portions 38 of the second cut ends 35d are positioned radially inside an outside diameter portion of the second coil end group 16r.

Thus, the cut ends 35c and 35d no longer protrude radially outward from the second coil end group 16r.

As a result, when the stator is being installed in the dynamoelectric machine, the cut ends 35d and 35c do not interfere with the housing 3, thereby improving mounting to the housing 3. Thus, electrically-insulating coating damage to the continuous conductor wires 30 resulting from interference with the housing 3 is eliminated, improving electrical insulation among the three winding phase portions. In addition, once the stator has been installed in the housing 3, a predetermined clearance is ensured between the housing 3 and the second cut ends 35d, improving electrical insulation between the housing 3 and the stator winding 16.

Embodiment 6

Figure 12:
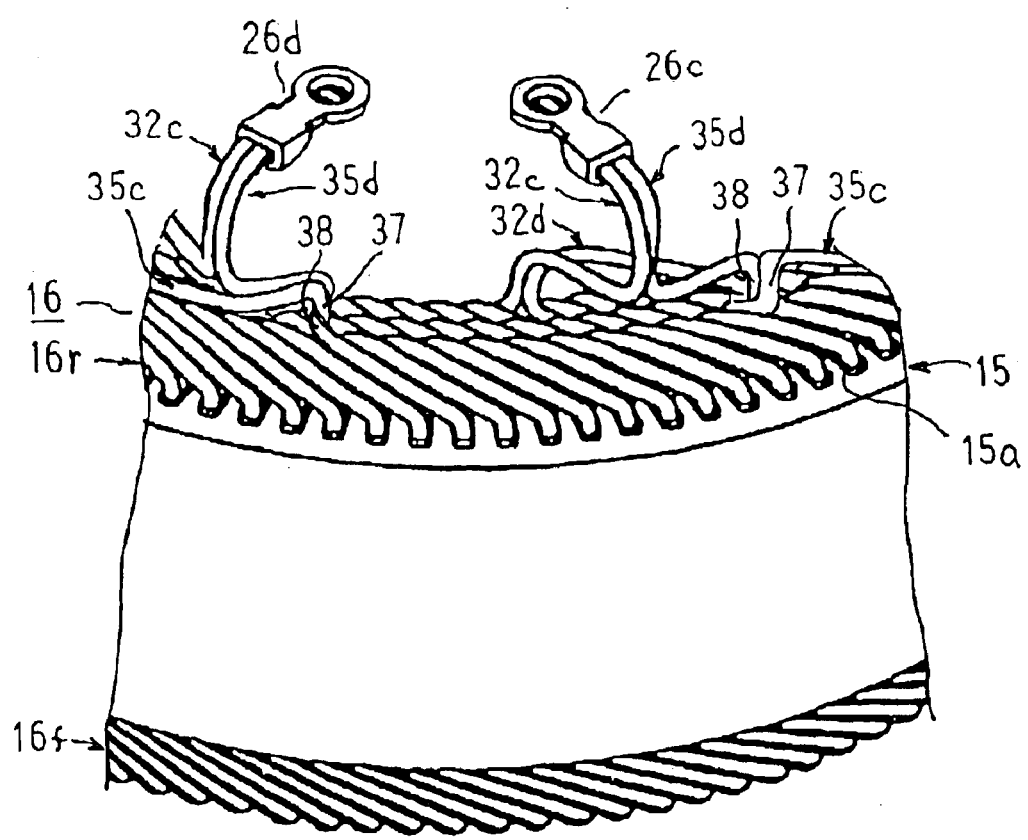
FIG. 12 is a perspective showing part of a stator according to Embodiment 6 of the present invention.

In Embodiment 6, as shown in FIG. 12, the second cut ends 35d constituting the output-wire lead wires are led around from the slots 15a over the apex portions of the coil ends to a radially-inner side, and are then shaped by bending so as to extend in an axial direction. Similarly, the first cut ends 35c constituting the neutral-point connection lead wires are led around from the slots 15a to the near side of the apex portions of the coil ends, and are then shaped by bending so as to extend in an axial direction. Then, the bent portions 37 and 38 of the cut ends 35c and 35d are twisted around each other to position the first cut ends 35c on a radially-outer side and the second cut ends 35d on the radially-inner side.

Moreover, the rest of this embodiment is constructed in a similar manner to Embodiment 5 above.

In Embodiment 6, the second cut ends 35d constituting the output-wire lead wires, which project from Address 6 of the slots 15a, are led around over the apex portions of the coil ends to the radially-inner side, and are then shaped by bending so as to extend in an axial direction. Similarly, the first cut ends 35c constituting the neutral-point connection lead wires, which project from Address 5 of the slots 15a, are led around from the slots 15a to the near side of the apex portions of the coil ends, and are then shaped by bending so as to extend in an axial direction. Then, the bent portions 37 and 38 of the cut ends 35c and 35d are twisted around each other so as to position the first cut ends 35c on the radially-outer side and the second cut ends 35d on the radially-inner side. Thus, the bent portions 37 and 38 of the cut ends 35c and 35d are positioned radially inside from an outside diameter portion of the second coil end group 16r.

As a result, the cut ends 35c and 35d no longer protrude radially outward from the second coil end group 16r, achieving effects similar to Embodiment 5 above.

Because the bent portions 37 and 38 of the cut ends 35c and 35d are twisted together, the hardness of the bent portions 37 and 38 thereof is increased by the twisting, increasing rigidity. As a result, the position of each of the lead wires is stable compared to Embodiment 5 above.

Moreover, each of the above embodiments has been explained as they apply to a stator for an alternator, but the dynamoelectric machine is not limited to an alternator and may also be an electric motor, or an electric motor-generator.

In each of the above embodiments, the stator winding 16 is constructed using continuous conductor wires 30, but the stator winding need only be an aligned winding in which coil ends are arranged regularly in a circumferential direction by installing conductor wires in a stator core so as to alternately occupy an inner layer and an outer layer in a slot depth direction; a stator winding may also be used which is an aligned winding constructed by joining together U-shaped conductor segments, for example.

In each of the above embodiments, each of the winding phase portions in the stator winding is formed into a wave winding, but the stator winding need only be an aligned winding in which coil ends are arranged regularly in a circumferential direction by installing conductor wires in a stator core so as to alternately occupy an inner layer and an outer layer in a slot depth direction; each of the winding phase portions may also be formed into a lap winding, for example.

In each of the above embodiments, the stator winding 16 is formed into first and second three-phase alternating-current windings 160A and 160B, but a stator winding may also be constituted by a single three-phase alternating-current winding in which the a-phase winding phase portion 25a and the d-phase winding phase portion 25d are connected in series to form an a'-phase winding phase portion, the b-phase winding phase portion 25b and the e-phase winding phase portion 25e are connected in series to form a b'-phase winding phase portion, and the c-phase winding phase portion 25c and the f-phase winding phase portion 25f are connected in series to form a c'-phase winding phase portion, the a'-phase winding phase portion, the b'-phase winding phase portion, and the c'-phase winding phase portion being formed into a Y connection. In that case, the three output-wire lead wires of the a'-phase winding phase portion, the b'-phase winding phase portion, and the c'-phase winding phase portion are led out of Address 6 of the slots 15a.

In each of the above embodiments, a stator core is used in which the number of slots per phase per pole is two, but the number of slots per phase per pole in the stator core is not limited to two; a stator core may also be used in which the number of slots per phase per pole is one, for example.

What is claimed is:

1. A stator for a dynamoelectric machine, said stator comprising:

a cylindrical stator core in which a plurality of slots are disposed in a circumferential direction; and a stator winding having a plurality of winding sub-portions each formed by installing a conductor wire so as to be returned outside said slots at end surfaces of said stator core and to alternately occupy an inner layer and an outer layer in a slot depth direction within said slots at intervals of a predetermined number of slots, return portions of said conductor wires returned outside said slots being arranged regularly in a circumferential direction to constitute coil end groups, wherein:

said stator winding comprises at least one three-phase alternating-current winding constructed by Y-connecting three winding phase portions composed of said plurality of winding sub-portions;

neutral-point connection lead wires of said three winding phase portions are each led out of a layer other than an outermost layer inside said slots, and one of output-wire lead wires of each of said three winding phase portions is led out of said outermost layer inside said slots; and said output-wire lead wires are positioned further inside than an outermost diameter of said coil end group relative to a radial direction.

2. The stator for a dynamoelectric machine according to claim 1, wherein:

a vicinity of a portion of said output-wire lead wire led out of said outermost layer inside said slots projecting from said coil end group is fixed to another of said conductor wires.

3. The stator for a dynamoelectric machine according to claim 2, wherein:

said output-wire lead wire led out of said outermost layer inside said slots is fastened to at least one of said neutral-point connection lead wires or at least one of said return portions of said conductor wires by a tie.

4. The stator for a dynamoelectric machine according to claim 2, wherein:

said output-wire lead wire led out of said outermost layer inside said slots is fixed to at least one of said return portions of said conductor wires by an electrically-insulating resin.

5. The stator for a dynamoelectric machine according to claim 2, wherein:

said output-wire lead wire led out of said outermost layer inside said slots and at least one of said neutral-point connection lead wires are gathered together and an electrically-insulating resin tube is mounted thereto.

6. The stator for a dynamoelectric machine according to claim 1, wherein:

said output-wire lead wire projects from said outermost layer inside said slots, is bent radially inward, and then bent axially outward and led away from said coil end group.

7. The stator for a dynamoelectric machine according to claim 6, wherein:

said neutral-point connection lead wire projects from inside said slot, is bent radially outward, then bent axially outward and led away from said coil end group, a portion of said neutral-point connection lead wire bent axially outward and a portion of said output-wire lead wire bent axially outward being lined up adjacently in a circumferential direction.

8. The stator for a dynamoelectric machine according to claim 6, wherein:

said neutral-point connection lead wire projects from inside said slot, is bent radially outward, then bent axially outward and led away from said coil end group, radial positions of a portion of said neutral-point connection lead wire bent axially outward and a portion of said output-wire lead wire bent axially outward being interchanged such that said portions are lined up adjacently in a radial direction.

* * * * *